(12) United States Patent
Salazar et al.

(10) Patent No.: US 7,809,098 B2
(45) Date of Patent: Oct. 5, 2010

(54) SYSTEM FOR EXCHANGING A CONTROL ROD DRIVE

(75) Inventors: Veronica Salazar, Bakersfield, CA (US); James Burner, Downingtown, PA (US); Mark W. Broaddus, Rohnert Park, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/850,707

(22) Filed: Sep. 6, 2007

(65) Prior Publication Data

US 2009/0067564 A1    Mar. 12, 2009

(51) Int. Cl.
*G21C 7/06* (2006.01)
*G21C 19/00* (2006.01)

(52) U.S. Cl. .................. 376/219; 376/223; 376/227; 376/260; 376/262

(58) Field of Classification Search .................. 376/219, 376/223, 227, 260, 262
See application file for complete search history.

(56) References Cited

U.S. PATENT DOCUMENTS

| 4,973,443 A | 11/1990 | Larson et al. ............... 376/260 |
| 5,784,426 A * | 7/1998 | Burner et al. ............... 376/260 |

* cited by examiner

*Primary Examiner*—Jack Keith
*Assistant Examiner*—Erin M Boyd
(74) *Attorney, Agent, or Firm*—Dale J. Davis; Ernest G. Cusick; Frank A. Landgraff

(57) ABSTRACT

A system for exchanging a control rod drive of a nuclear reactor is provided. The system may include an integrated drive exchange assembly system (IDEAS). The IDEAS may include a trunnion cart attached to a tower assembly. The tower assembly may include an integrated extension carriage assembly.

The IDEAS may also include a control rod drive adapter; and a lead cart connected to the trunnion cart assembly.

20 Claims, 18 Drawing Sheets

Section A-A

SYSTEM FOR EXCHANGING A CONTROL ROD DRIVE

BACKGROUND OF THE INVENTION

The present invention relates generally to nuclear reactors and, more particularly, to removing and installing control rod drives (CRDs) in a nuclear reactor.

Control rod drives are used in a nuclear reactor to control the position of the control rods within the reactor core. The CRDs typically extend from the reactor pressure vessel in the under vessel area.

Occasionally CRDs are removed for maintenance and repair. Subsequent to servicing, the CRDs are reinstalled. CRDs should be moved in a safe and controlled manner to prevent damage to the CRD and/or adjacent equipment. After removal from a housing, the CRD should be rotated from a vertical position to a horizontal position, and secured for transporting out of the tinder vessel area. These activities should be performed by a minimum number of personnel and accomplished quickly and efficiently to reduce radiation exposure.

One known method for exchanging a CRD is to attach an extension tube to the bottom of the CRD and thread a cable over a stationary idler pulley and through the bottom of the extension tube. The cable is secured to a static hanger. A winch then pays out the cable and the CRD is lowered until the extension tube contacts the floor of the under vessel area. A second cable winch is then employed to secure a clamp around the CRD at the approximate mid-length of the CRD. With the second winch securing the weight of the CRD, an operator is required to enter the basement of the under vessel area to remove the extension tube. The second cable winch then pays out cable until the CRD is out of the housing. Once the CRD is out of the housing, the CRD is then manually positioned from the vertical position to a horizontal position as the second winch lifts the CRD up to the equipment platform. When the CRD is above the lower track, or rail, on the equipment platform, a transport cart is rolled into position under the horizontal CRD. The second winch then pays out the cable to land the CRD on the cart. The cable rigging is removed from the CRD, and the cart with the CRD is pulled out of the under vessel area.

Another known system for removing a CRD is a rigid tower system, which allows the CRD to be lowered into a tower supported by a trunnion cart. The CRD is raised and lowered by an elevator secured within the tower. The known tower systems use either roller chains, timing belts, cable or hydraulic cylinders, and employ built-in air or hydraulic motors with supply and control (air) logic and hydraulic lines to raise and lower the elevator tower. The known tower systems also incorporate a separate extension tube, which provides the extended throw required to install or remove a CRD.

There are a few drawbacks with the currently known systems for exchanging CRDs. The currently known systems tend to be complex, time consuming to operate, and are susceptible to causing a CRD to fall onto the floor of the under vessel area. The currently known systems may expose operators to higher levels of radiation. The currently known systems may include built-in drive motors, which may be difficult and time consuming to replace if failure occurs during CRD exchange. The currently known systems may include components subject to damage and failure causing down time and high maintenance costs. The currently known systems may include two parallel screws synchronized with a timing belt to move the CRD, wherein the timing belt may slip causing the elevator to become unleveled; thereby preventing movement of the CRD.

For the foregoing reasons, there is a need for a system for exchanging a CRD. The system should include two independent screws with independent travel. The system should not include: roller chains, timing belts, cable, or hydraulic cylinders. The system should not employ built-in air or hydraulic motors with supply and control (air) logic and hydraulic lines to raise and lower the elevator tower. The system should not require a separate extension tube.

BRIEF DESCRIPTION OF THE INVENTION

In accordance with an embodiment of the present invention, an integrated drive exchange assembly system for moving a control rod drive in a nuclear reactor, the reactor including a reactor pressure vessel, an under vessel area located below the reactor pressure vessel, and an equipment platform between the under vessel area and a basement, the system comprising: a tower forming a control rod drive receiving area comprising an open face and an open trough; a first and a second screw extending substantially the length of the tower, the first and the second screw mounted to opposite sides of the tower, wherein as the first screw is rotated, the second screw does not rotate, and wherein as the second screw is rotated, the first screw does not rotate; an elevator platform coupled to the first screw and movable relative to the first and the second screws, the platform configured to engage a portion of the control rod drive and to substantially support the control rod drive; an extension carriage assembly coupled to the second screw and movable relative to the first and the second screws, the extension carriage assembly configured to engage a portion of a control rod drive (CRD) adapter and to substantially support the control rod drive; and a trunnion cart engaged to the tower so that the tower is rotatable relative thereto; the trunnion cart comprising an automatic vertical lock for locking the tower in a vertical position; wherein the integrated drive exchange assembly system is operable for moving the CRD from the reactor pressure vessel and movable with the control rod drive so that the integrated drive exchange assembly system and the control rod drive are movable together out from the under vessel area.

In accordance with an alternate embodiment of the present invention, an integrated drive exchange assembly system for moving a control rod drive in a nuclear reactor, the reactor including a reactor pressure vessel, an under vessel area located below the reactor pressure vessel, and an equipment platform between the under vessel area and a basement, the system comprising: a tower forming a control rod drive receiving area comprising an open face and an open trough; and further comprising at least one lower bearing block secured at one end of the first and the second screws to the tower, and the first and the second screws extending through the lower bearing block; a first and a second screws extending substantially the length of the tower, the first and the second screws mounted to opposite sides of the tower, wherein as the first screw is rotated, the second screw does not rotate, and wherein as the second screw is rotated, the first screw does not rotate; an elevator platform coupled to the first screw and movable relative to the first and the second screws, the platform configured to engage a portion of the control rod drive and to substantially support the control rod drive; wherein the elevator platform allows for a portion of the control rod drive to extend through the elevator platform; an extension carriage assembly coupled to the second screw and movable relative to the first and the second screws, the extension carriage assembly configured to engage a portion of a control rod drive adapter and to substantially support the control rod drive; wherein the extension carriage assembly comprises an extension channel and wherein at least one link is secured to the tower, the link configured to support the extension channel, the link rotatable relative to the tower so that the extension channel can be moved between a first position and a second position; further comprising at least one link secured to the tower, the link configured to support the extension channel, the link rotatable relative to the tower so that the extension channel can be moved between a first position and a second position; and a trunnion cart engaged to the tower so that the tower is rotatable relative thereto; the trunnion cart comprising an automatic vertical lock for locking the tower in a vertical position; wherein the integrated drive exchange assembly system is operable for moving the CRD from the reactor pressure vessel and movable with the control rod drive so that the integrated drive exchange assembly system and the control rod drive are movable together out from the under vessel area.

BRIEF DESCRIPTION OF THE DRAWINGS

FIG. 9, are perspectives views of the extension carriage assembly of FIG. 7 connected to a tower assembly, in accordance with an embodiment of the present invention.

DETAILED DESCRIPTION OF THE INVENTION

Certain terminology is used herein for convenience only and is not to be taken as a limitation on the invention. For example, words such as "upper," "lower," "left," "front", "right," "top", "horizontal," "vertical," "upstream," "downstream," "fore", and "aft" merely describe the configuration shown in the Figures. Indeed, the components may be oriented in any direction and the terminology, therefore, should be understood as encompassing such variations unless specified otherwise.

The following Figures may include components that are not discussed herein and are shown for illustrative purposes only. The elements of the integrated drive exchange assembly system 1000 discussed herein may be fabricated of a stainless steel or other material capable of withstanding the operating loads associated with the system 1000. The elements discussed herein may be connected, joined, or fastened, or the like, via methods commonly used in the art.

Figure 1:
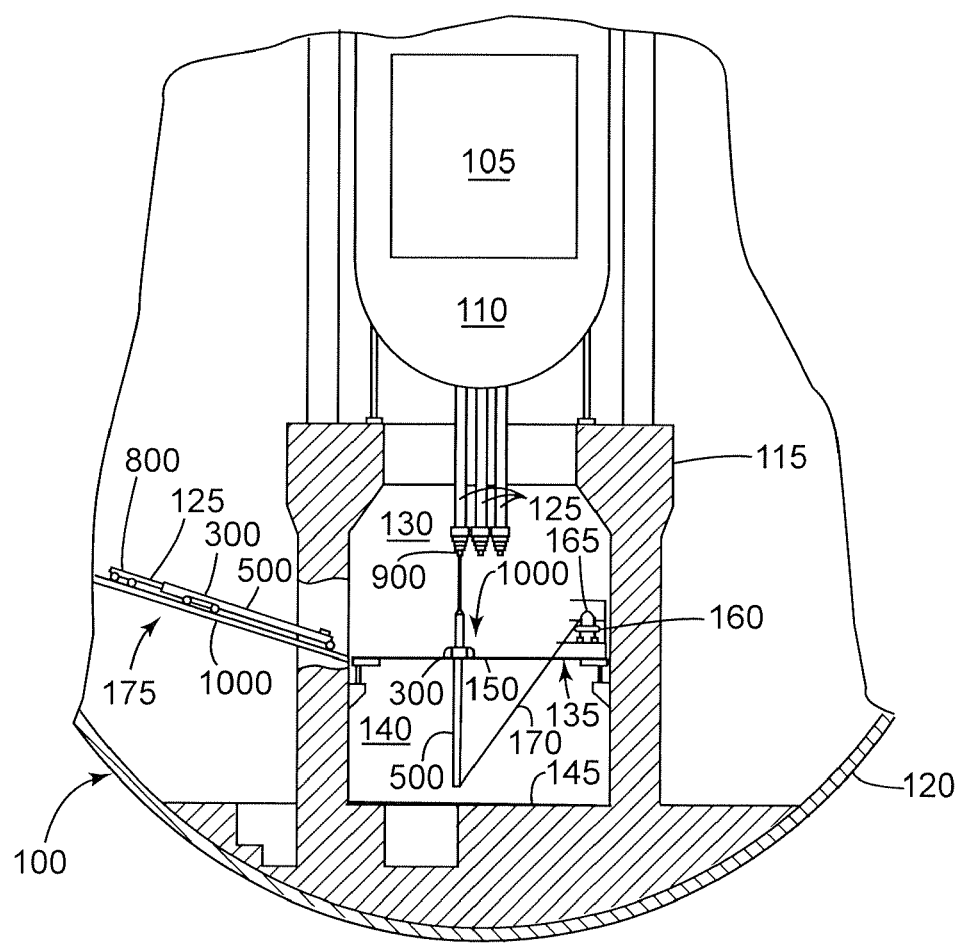
FIG. 1 is a schematic illustrating the environment in which an embodiment of the present invention operates.

Referring now to the Figures, where the various numbers represent like elements throughout the several views, FIG. 1 is a schematic illustrating the environment in which an embodiment of the present invention operates. FIG. 1 illustrates a cross sectional view of a boiling water nuclear reactor 100 including a reactor core 105 positioned within a reactor pressure vessel 110. The reactor pressure vessel 110 is supported by a reactor pressure vessel support structure 115 housed within the containment 120. A plurality of control rod drives (CRDs) 125 extend from the reactor pressure vessel 110 and into an under vessel area 130. A CRD equipment platform 135 is located below the reactor pressure vessel 110, and a basement 140 is located below the equipment platform 135. A subpile floor 145 is located at the bottom of basement 140.

The CRD equipment platform 135 includes rails 150 upon which a trunnion cart assembly 300 is mounted. Also, a winch assembly 165 may be on the rails 150.

A tower assembly 500 extends from, and may be rotatably secured to, the trunnion cart assembly 300 into the basement 140 and towards the CRDs 125. As illustrated in FIG. 1, the tower assembly 500 may be aligned with a CRD 125, and an extension carriage assembly 570 extends from an upper section of tower assembly 500 to the CRD 125. A cable 170 attaches to the lower section of the tower assembly 500 to a winch assembly 165 mounted on an upender cart 160.

As described below, the winch assembly 165 may move the tower assembly 500 from a vertical position to a horizontal position. Moreover, after the CRD 125 is loaded into tower assembly 500 in the vertical position, the winch assembly 165, with the aid of the upender cart 160, may rotate the tower assembly 500 to a horizontal position for transporting up a transfer chute 175.

Figure 2:
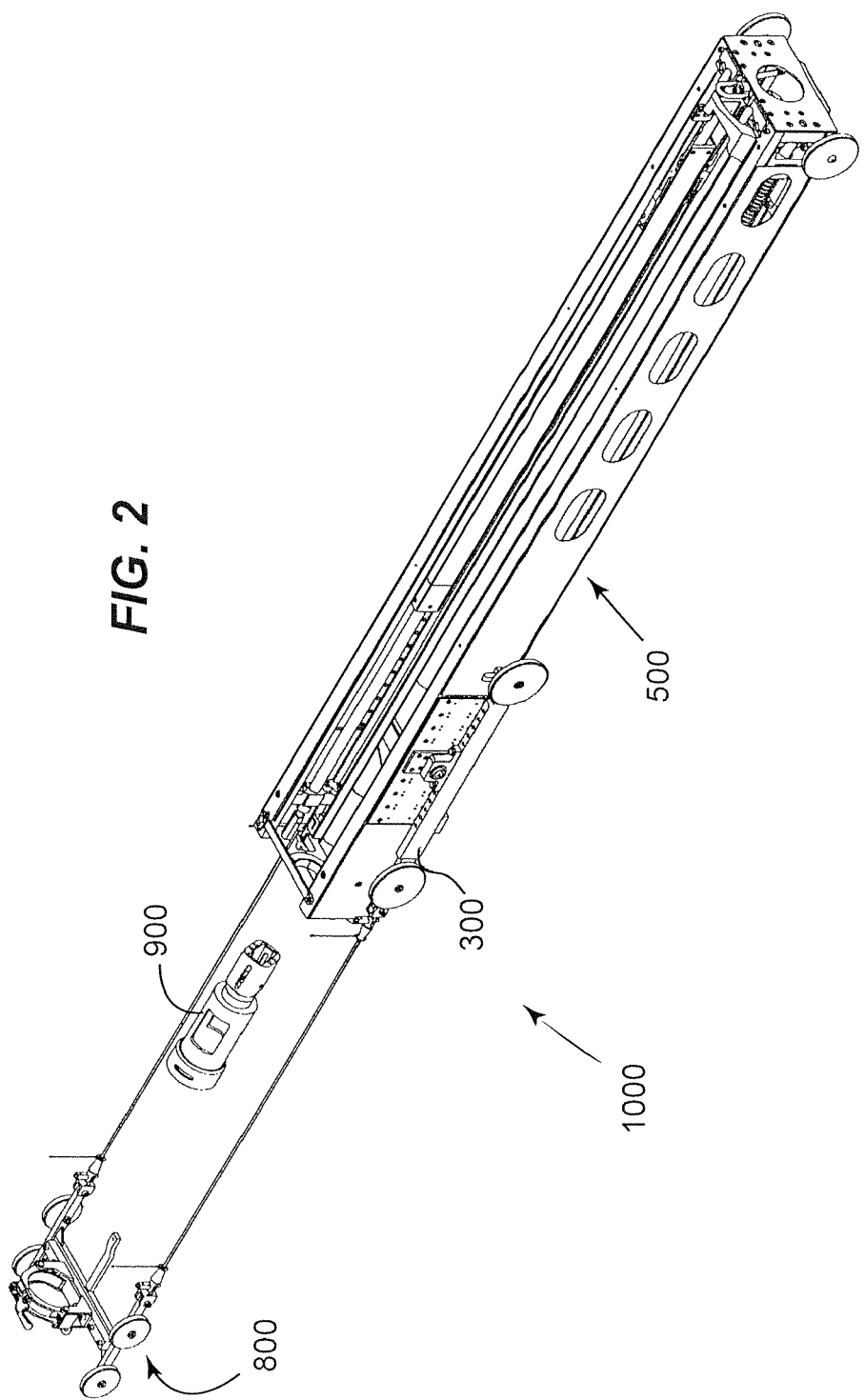
FIG. 2 is a perspective view of an integrated drive exchange assembly system in accordance with an embodiment of the present invention.

Referring now to FIG. 2, which is a perspective view of an integrated drive exchange assembly system 1000 in accordance with an embodiment of the present invention. The integrated drive exchange assembly system 1000 (IDEAS) may include the following sub-components: a trunnion cart assembly 300 attached to a tower assembly 500; a CRD adapter 900 for supporting a CRD; and a lead cart assembly 800 connected to the trunnion cart assembly 300.

The foregoing description provided an overview of the IDEAS 1000. The following sections describe the components of the IDEAS 1000, illustrated in FIG. 2, more detail.

Tower Assembly

Figure 3:
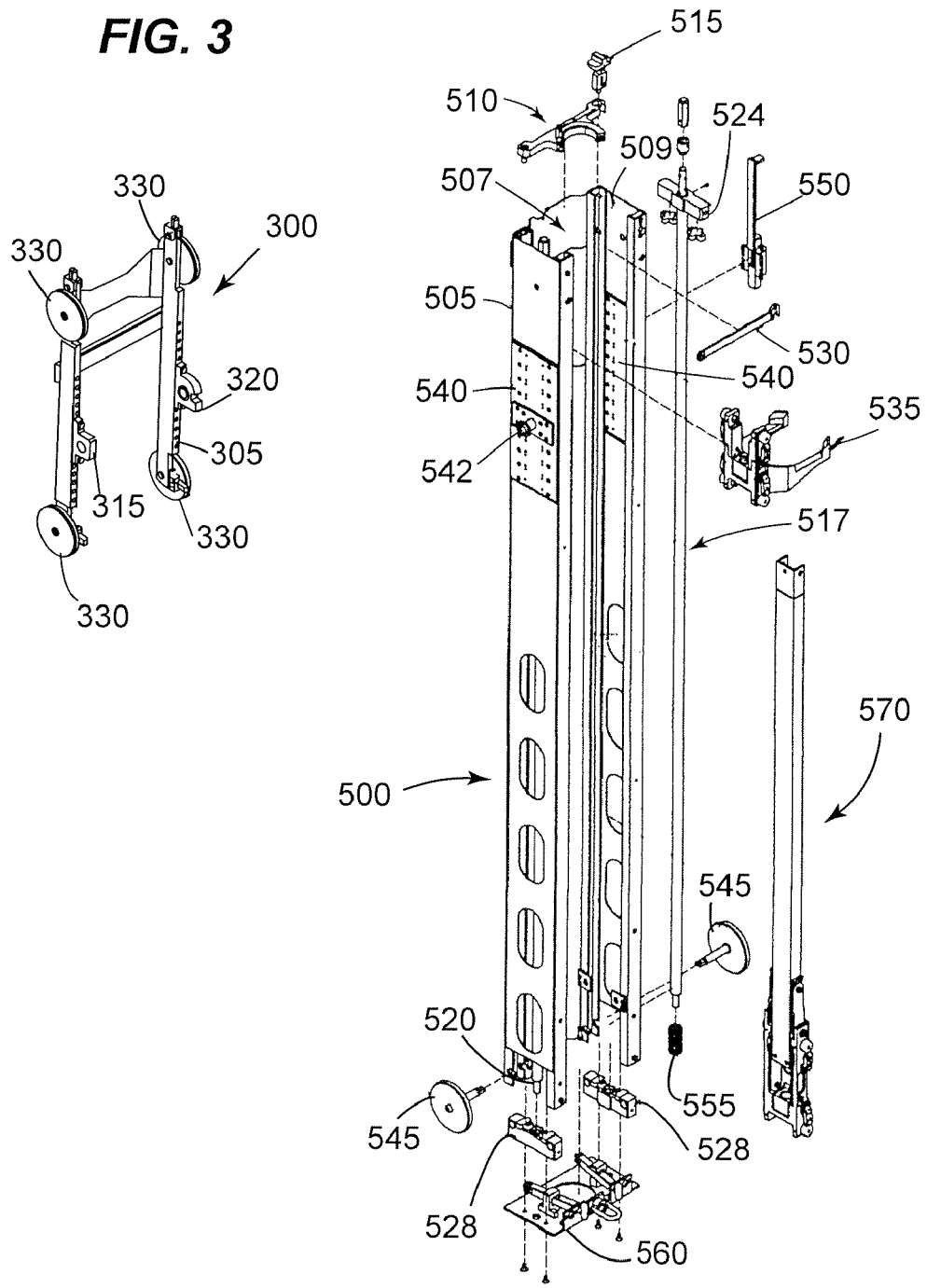
FIG. 3 is an exploded perspective view of the tower assembly of FIG. 2 in accordance with an embodiment of the present invention.

FIG. 3 is an exploded perspective view of the tower assembly 500 of FIG. 2, in accordance with an embodiment of the present invention. The tower assembly 500 may include a tower 505; a plurality of screw assemblies 517, here illustrated as screws, but other screws and/or gears, such as a worm gear, are possible and within the scope of the invention discussed below; an elevator platform 535; and an extension carriage assembly 570

The tower 505 may have a substantially open face 507 that may include an open trough 509. The tower 505 may have a length approximately equal to the length of a CRD 125. A tower clamp 510 and a tower clamp knob 515 may be connected to the tower 505 near a distal end. A portion of the tower clamp 510 may be shaped to envelope a portion of the CRD 125 and to limit the movement of the CRD 125 within the tower 505. The tower clamp knob 515 may be a spring-loaded mechanism that secures the position of the tower clamp 510. Also attached near the distal end of the tower 505 may be a tower gate 530. An end of the tower gate 530 may be connected to a first side of the tower 505, as illustrated in FIG. 3. An opposite end of the tower gate 530 may be rotatably connectable to a second side of the tower 505. The tower gate 505 may serve to secure the CRD 125 within the open trough 509.

The tower 505 may include a plurality of mounting plates 540. The mounting plates 540 may be connected on opposite sides of the tower 505. Attached to each mounting plate 540 may be a trunnion axle 542. The mounting plate 540 and trunnion axle 542 may allow for the trunnion cart assembly 300 (discussed below) to be connected to the tower 505. A vertical lock assembly 550 may also be connected to the tower 505 and may ensure that the CRD 125 is locked in a vertical position, as discussed below.

Each of the plurality of screw assemblies 517 may include: either a first or a second screw 520, 522. Each screw 520, 522 may be connected to the tower 505 via an upper bearing block 524 and a lower bearing block 528. As illustrated, the upper bearing block 524 may be connected to an upper portion of the tower 505; and the lower bearing block 528 may be connected to a lower portion of the tower 505. Slidably engaged to each of the screws 520, 522 may be at least one elevator platform spring 555, which may dampen a portion of the load of the CRD 125 experienced by the tower 505.

Connected to a lower end of the tower 505 may be a plurality of cam wheel assemblies 545, which allows for the tower assembly 500 to slide along the rails 150. The cam wheel assemblies 545 may also be integrated with an end plate assembly 560. The end plate assembly 560 may allow for lateral movement of the cam wheel assemblies 545, necessary when rotating the tower assembly 500 from a horizontal to a vertical position.

An extension carriage assembly 570 may be coupled with the second screw 522. As discussed below, the extension carriage assembly 570 may extend beyond the overall length of the tower assembly 500, allowing for the CRD adapter 900 to install or remove a CRD 125 within the reactor pressure vessel 110.

An elevator platform 535 may be coupled to a first screw 520. The elevator platform 535 may receive an end of a CRD 125 and move the CRD 125 from the under vessel area 130 to the bottom of the tower 505. The elevator platform 535 may be movable relative to the first and the second screw 520, as is further discussed below.

Figure 4:
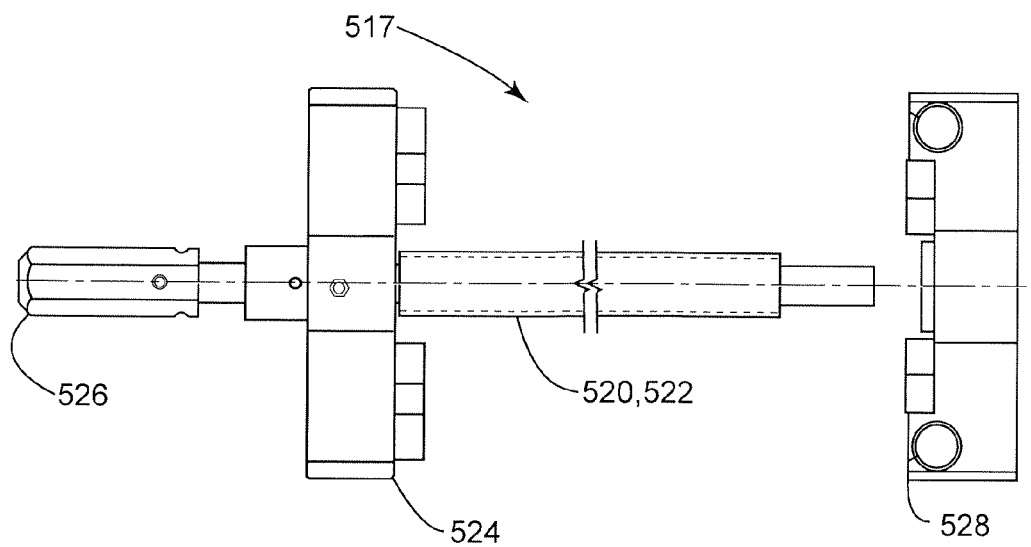
FIG. 4 is a top plan view, partially exploded, of the screw assembly of FIG. 3 in accordance with an embodiment of the present invention.

FIG. 4 is a top plan view, partially exploded, of the screw assembly 517 of FIG. 3 in accordance with an embodiment of the present invention. As discussed, each screw assembly 517 may include a screw 520,522; an upper bearing block 524, a lower bearing block 528; and a head 526 connected to a top end of each screw 520, 522. Head 526 is illustrated as a hex head in FIG. 4, but other heads capable of rotating the screw 520,522 are possible and within the scope of the invention. A lower end of the screw 520, 522 may include a portion allowing for mating and securing with the lower bearing block 528. An upper portion of the screw 520,522 may include a portion for allowing for mating and securing with the upper bear block 524. The overall length of the each screw 520, 522 may extend substantially along the length of the tower. The first and the second screws 520, 522 may be mounted to opposite sides of the tower 505.

Figure 5:
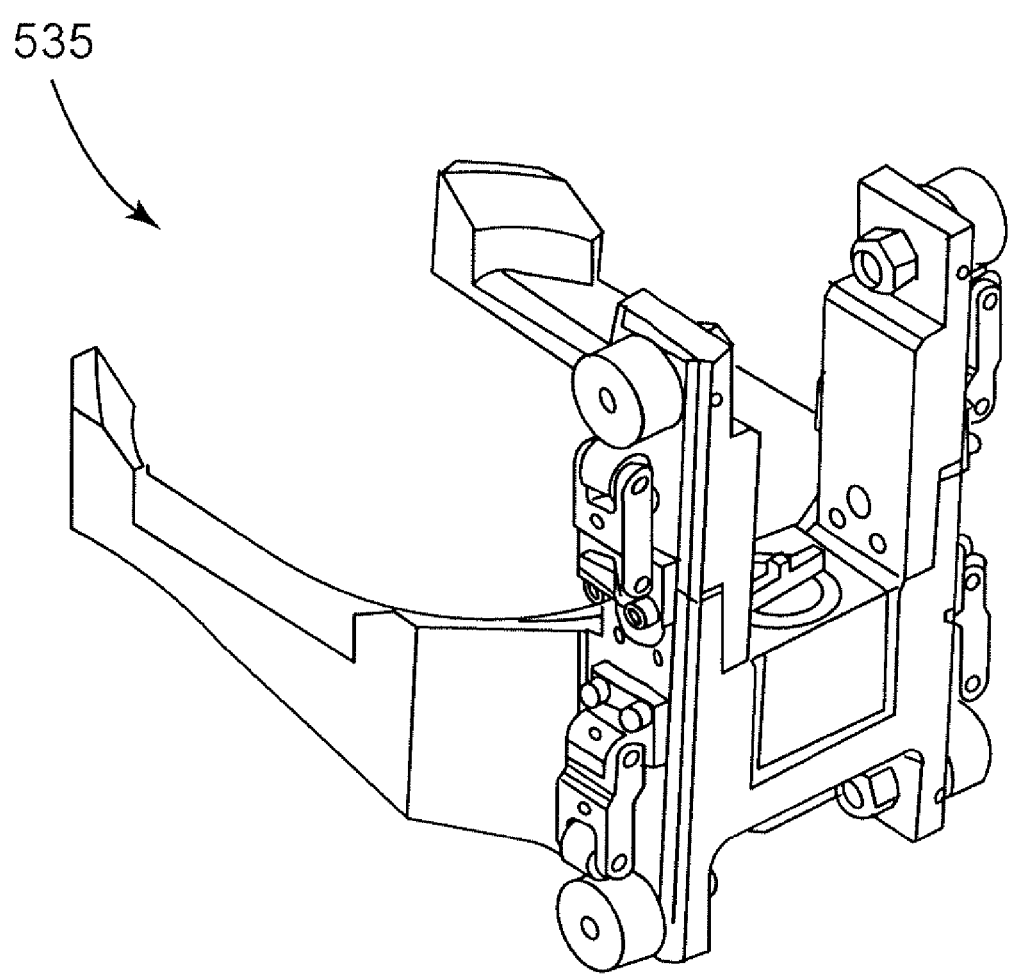
FIG. 5 is a perspective view of the elevator platform of FIG. 3 in accordance with an embodiment of the present invention.

FIG. 5 is a perspective view of the elevator platform 535 of FIG. 3 in accordance with an embodiment of the present invention. The elevator platform 535 may be coupled to the first screw 520 (not illustrated in FIG. 5), and may be movable relative to the screws 520 and 522. Furthermore, as screw 520 rotates, elevator platform moves up or down, depending on the direction of rotation of the screw 520. Elevator platform 535 may be configured to receive an end portion of the CRD 125, partially inserted therein.

Figure 6:
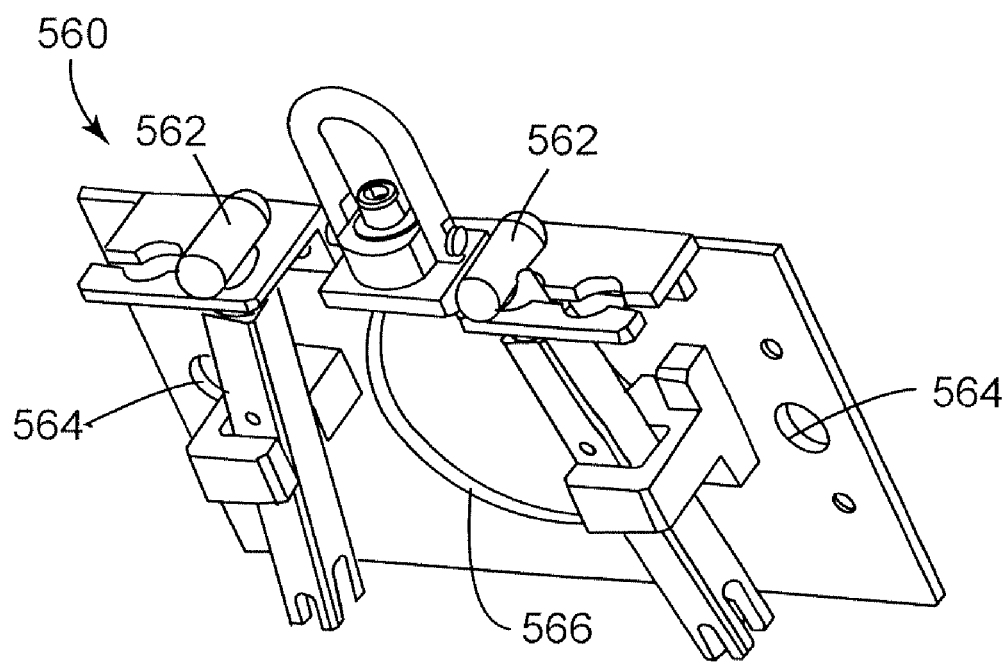
FIG. 6 is a perspective view of the end plate assembly of FIG. 3 in accordance with an embodiment of the present invention.

FIG. 6 is a perspective view of the end plate assembly 560 in accordance with an embodiment of the present invention, illustrating the end plate assembly 560, which may include slides handles 562; screw openings 564; and an end plate opening 566.

The slide handles 562 may be used to adjust the lateral position of the cam wheel assemblies 545 (illustrated in FIG. 3). The slide handles 562 may extend the lateral position of the cam wheel assemblies 545, allowing for the horizontally positioned tower assembly 500 to slide along the rails 150. The slide handles 562 may retract the lateral position of the cam wheel assemblies 545, allowing for the tower assembly 500 to pivot, around an axis of the trunnion cart assembly 300, into a vertical position.

One screw opening 564 may receive an end of the first screw 520; and the second screw opening 564 may receive a similar end of the second screw 522. The end plate opening 566 may be sufficiently sized to allow for a portion of the CRD 125 (not illustrated in FIG. 6) to extend through.

Figure 7:
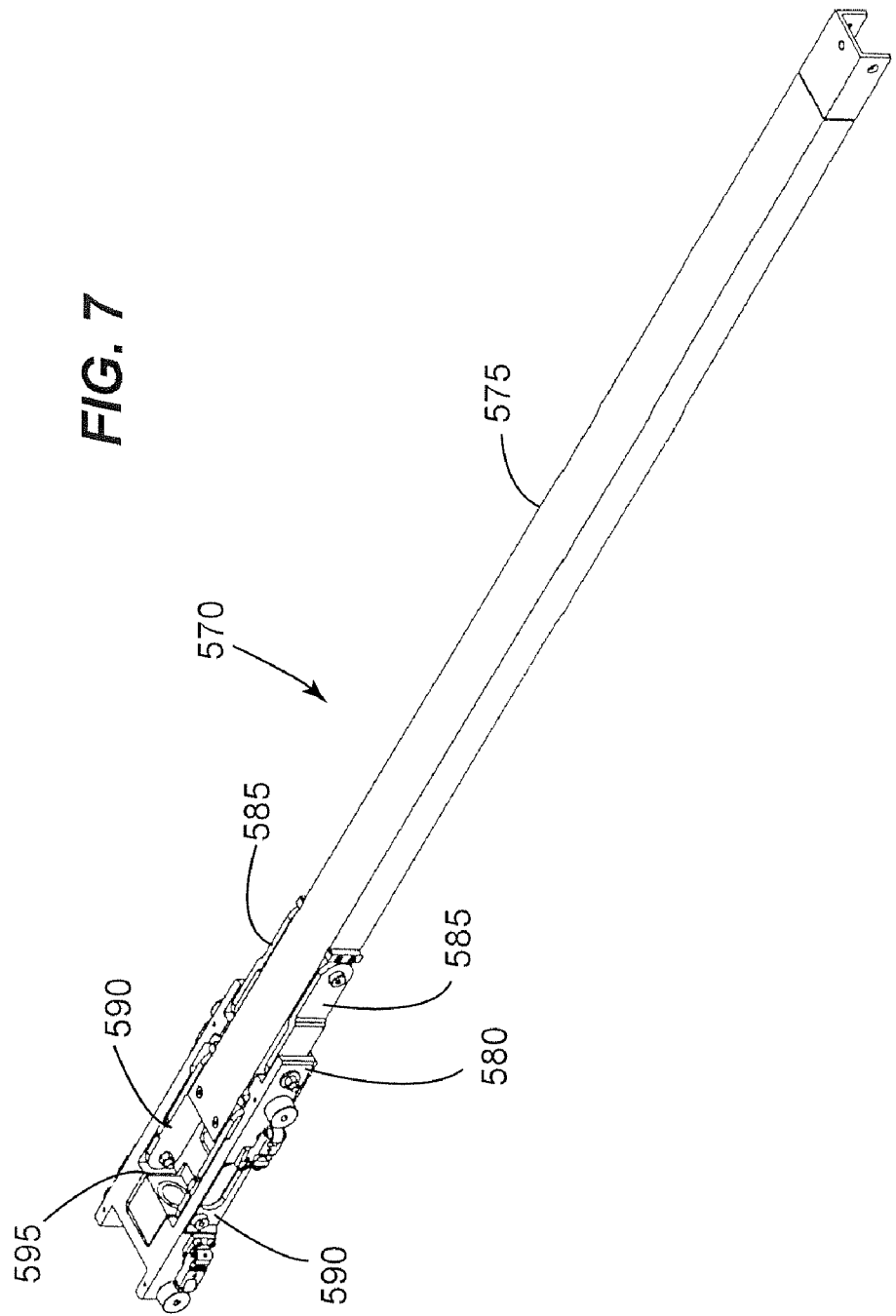
FIG. 7 is a top plan view of the extension carriage assembly of FIG. 3 in accordance with an embodiment of the present invention.

FIG. 7 is a top plan view of the extension carriage assembly 570 of FIG. 3 in accordance with an embodiment of the present invention. The extension carriage assembly 570 may include an extension channel 575; an extension roller housing 580; an upper extension roller link 585; a lower extension roller link 590; and an extension channel opening 595.

The extension roller housing 580 may integrate with the tower 505 and allow the extension carriage assembly 570 to engage the CRD adapter 900 while the IDEAS 1000 is installing or removing a CRD.

Figure 8:
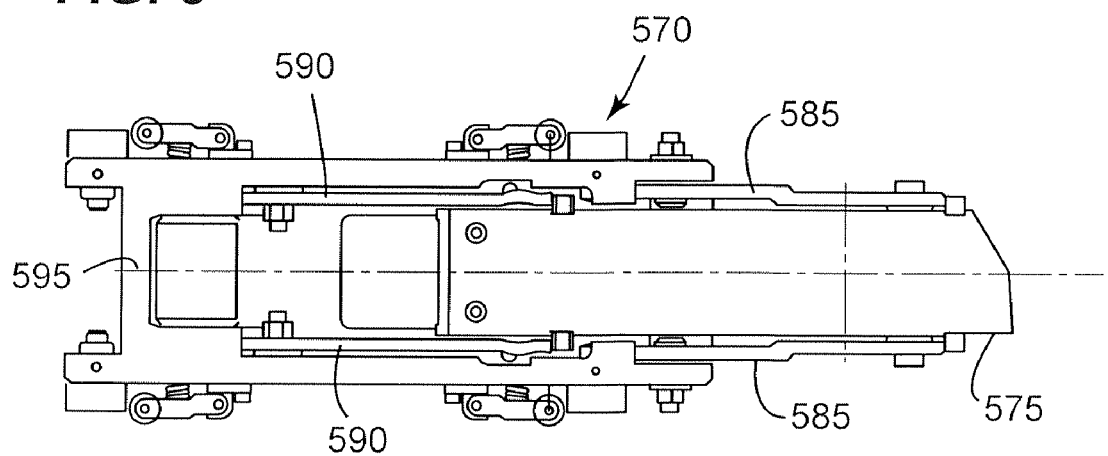
FIG. 8 is a top plan view of the components of the extension carriage assembly of FIG. 7, in accordance with an embodiment of the present invention.

As illustrated in FIG. 8, which is a top plan view of the components of the extension carriage assembly 570, an end portion of the extension channel 575 may be connected to a portion of the extension roller housing 580. The extension channel 575 may be used to provide the extra length required to install or remove a CRD 125. Since the length of tower assembly 500 in the vertical position may be fixed, the tower assembly 500 may not extend into the under vessel area 130, (as illustrated in FIG. 1); therefore, the extension channel 575 may be used to complete the operation.

The extension channel 575 may have a substantially rectangular shape with an end portion secured to the extension roller housing 580 and an opposite end portion may allow for the extension channel 575 to mate with the CRD adapter 900, as illustrated in FIGS. 7 and 8. The width and depth of the extension channel 575 may be sized to allow for the extension channel 575 to pass through the elevator platform 535. The extension channel 575 may be of sufficient strength to bear a substantial portion of the weight of the CRD 125.

Also connected to the extension roller housing 580 are an upper extension roller link 585 and a lower extension roller link 590, as illustrated in FIGS. 7 and 8. Links 585 and 590 may connect the tower 505 to the extension carriage assembly 570. Links 585 and 590 may allow for the extension channel 575 to move between a first position within the tower 505 and a second position within the open trough 509 of the tower 505, as discussed below.

The extension roller housing 580 may also include an extension channel opening 595, which may allow for a portion of the second screw 522 to travel through.

Figure 9B:
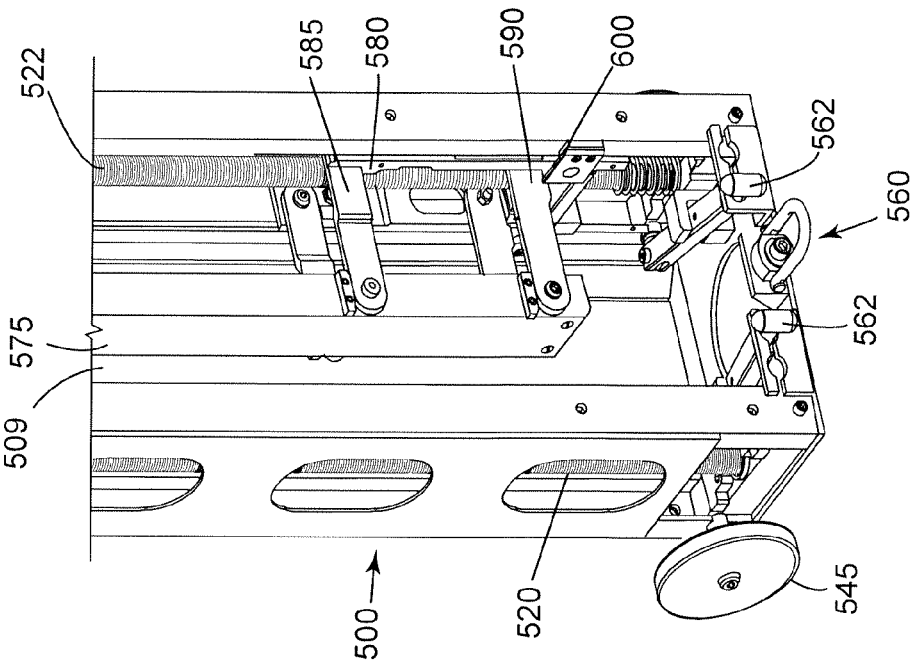
FIGS. 9a and 9b, collectively
Figure 9A:
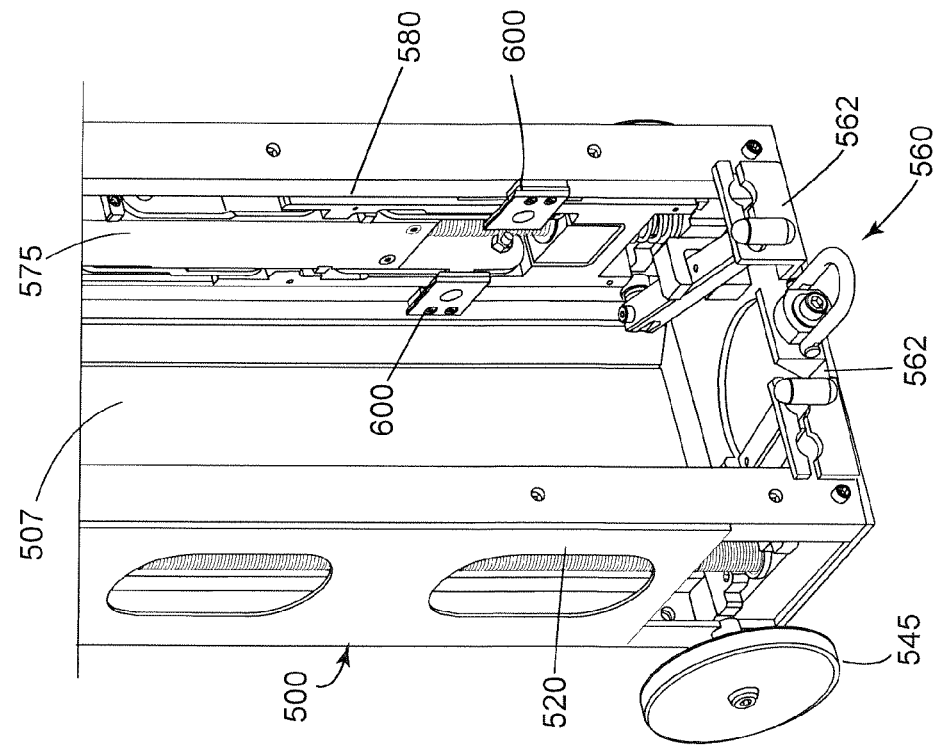

FIGS. 9a and 9b, collectively FIG. 9, are perspectives views illustrating the extension carriage assembly 570 of FIG. 7 connected to a tower assembly 500, in accordance with an embodiment of the present invention.

FIG. 9a illustrates a portion of the extension carriage assembly 570 connected to the tower 505 in a first position. The first position may be considered a position where the extension carriage assembly 570 is stowed within a portion of the open trough 509 of the tower 505. The shape of the extension channel 575 may allow for covering the second screw 522 while the extension channel 575 is in the first position. The first position may allow for the elevator platform 535 (not illustrated in FIGS. 9a and 9b) to be lowered and positioned adjacent the end plate assembly 560, wherein for example, but not limiting of, the CRD 125 may be transported. In this first position the upper extension roller link 585 and the lower extension roller link 590 are not extended and the extension channel 575 is not positioned for use.

FIG. 9b illustrates a portion of the extension carriage assembly 570 connected to the tower 505 in a second position. The second position may be where the extension carriage assembly 570 is positioned to provide the extra length required to install or remove a CRD 125 from the reactor pressure vessel 110 (not illustrated in FIGS. 9a and 9b). In this second position the upper extension roller link 585 and the lower extension roller link 590 are fully extended and the extension channel 575 extends substantially into the open trough 509. A plurality of guide stops 600 may be used to limit the rotation of the lower extension roller link 590. The guide stop 600 may help to ensure that the extension channel 575 remains in the correct position during operation. As discussed below, the extension roller housing 580 may move vertically in conjunction with the direction of rotation of the second screw 522. As the extension roller housing 580 moves, the extension channel 575 may also move in the same direction.

Trunnion Cart

Figure 10:
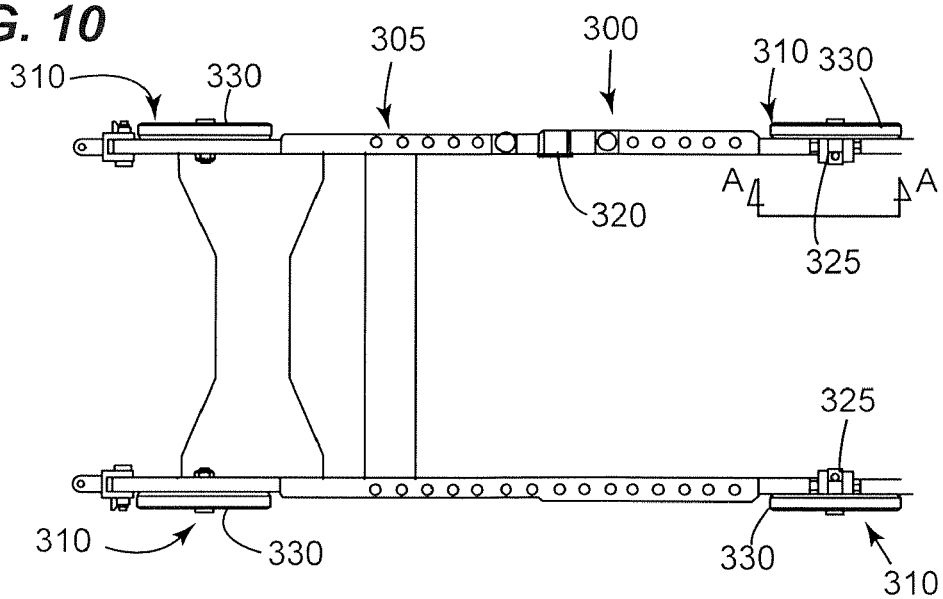
FIG. 10 is a top plan view of the trunnion cart of FIG. 3 in accordance with an embodiment of the present invention.
Figure 13:
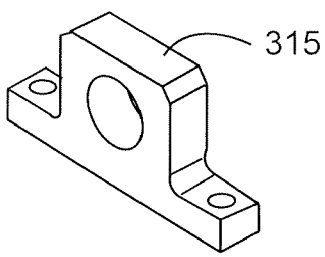
FIG. 13 is a perspective view of the pillow block of FIG. 11 in accordance with an embodiment of the present invention.

FIG. 10 is a top plan view of the trunnion cart 300 of FIG. 3 in accordance with an embodiment of the present invention. The cart 300 may include a trunnion cart frame 305; a plurality of trunnion cart wheel assembly 310; a pillow block 315 (also illustrated in FIG. 13); and a vertical lock pillow block 320 (also illustrated in FIG. 14). The plurality of trunnion cartwheel assembly 310 may be connected to the trunnion cart frame 305. Also connected to the trunnion cart frame 305 may the pillow block 315; and the vertical lock pillow block 320. The frame 305 may have a rectangular shape.

Figure 11:
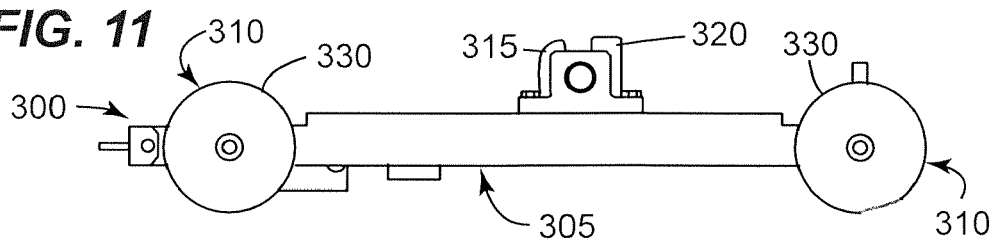
FIG. 11 is a side elevation view of the trunnion cart of FIG. 10 in accordance with an embodiment of the present invention.

FIG. 11 is a side elevation view of the trunnion cart 300 of FIG. 10 in accordance with an embodiment of the present invention. The pillow block 315 may be mounted to a top portion of the frame 305. The vertical lock pillow block 320 may be mounted opposite the pillow block 315. The mounting positions of the pillow block 315 and the vertical lock pillow block 320 may allow for trunnion axles 542 (illustrated in FIG. 3) to rotate therein, when the IDEAS 1000 is in use.

Figure 14:
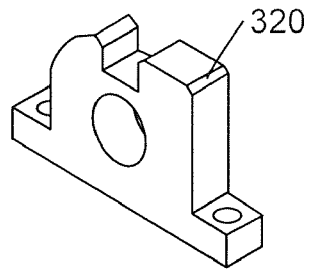
FIG. 14 is a perspective view of the vertical lock pillow block of FIG. 11 in accordance with an embodiment of the present invention.
Figure 15:
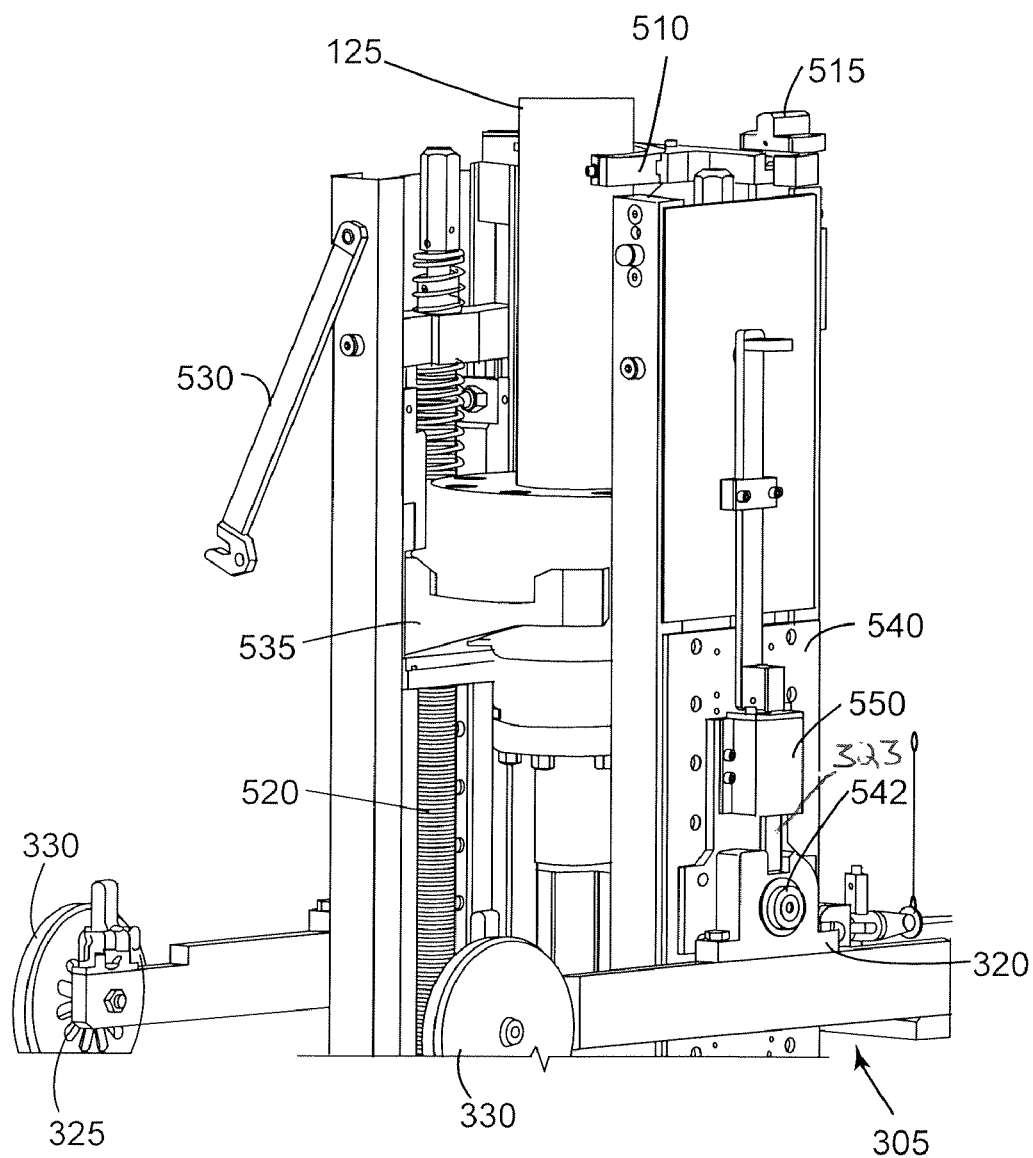
FIG. 15 is a perspective view of the vertical lock pillow block of FIG. 14 connected to a tower assembly in accordance with an embodiment of the present invention.

Briefly referring now to FIG. 15, which is a perspective view of the vertical lock pillow block 320 of FIG. 14 connected to a tower assembly 500, in accordance with an embodiment of the present invention. The tower assembly 500 is rotated from a horizontal position to a vertical position and the vertical lock pin 323 may automatically engage. The vertical lock pin 323 may remain engaged until the vertical lock assembly 550 is utilized to release the vertical lock pin 323. For example, but not limiting of, before an operator may rotate the tower assembly 500 from a vertical position to a horizontal position, the operator may utilize the vertical lock assembly 550 to release the vertical lock pin 323.

Figure 12:
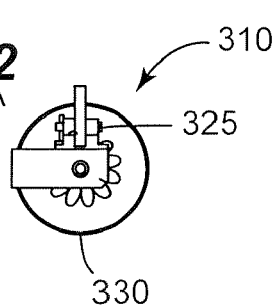
FIG. 12 is a rear view of the trunnion cart-wheel assembly of FIGS. 10 and 11, in accordance with an embodiment of the present invention.

FIG. 12 is a rear view of the trunnion cart-wheel assembly 310 of FIGS. 10 and 11, in accordance with an embodiment of the present invention; the trunnion cart-wheel assembly 310 may include a trunnion cart wheel lock 325; and a trunnion cart wheel 330. The trunnion cart wheel 330 may include a plurality of ratchet positions, or the like, each of which may be connectable with the trunnion cart wheel lock 325. After the trunnion cart assembly 300 is located in a desired position, an operation may engage the trunnion cart wheel lock 325 to prevent the movement.

CRD Adapter

Figure 16:
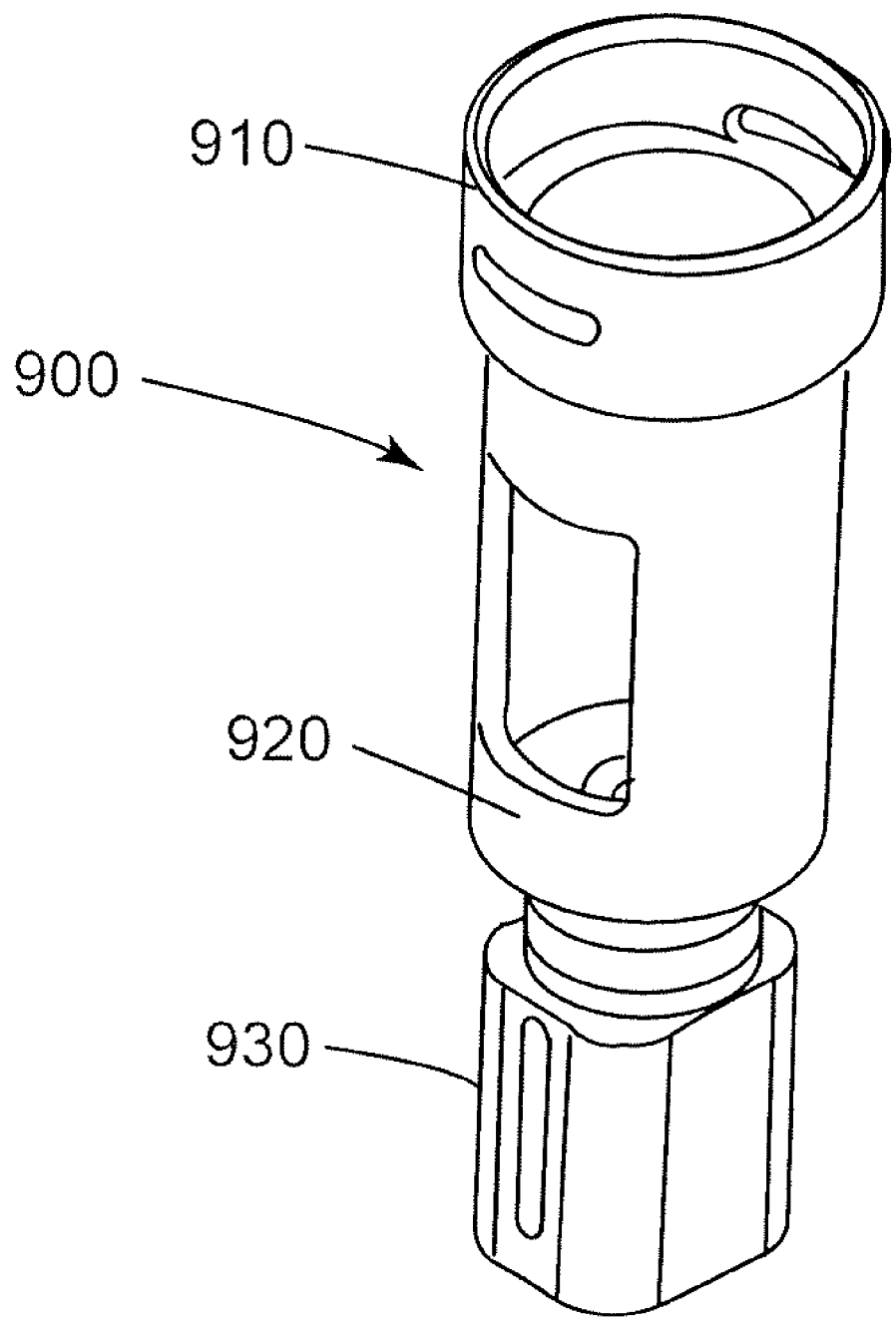
FIG. 16 is a perspective view of the CRD adapter of FIG. 3 in accordance with an embodiment of the present invention.

FIG. 16 is a perspective view of the CRD adapter 900 of FIG. 3 in accordance with an embodiment of the present invention. The CRD adapter 900 may include a CRD seating flange 910; a CRD adapter cup 920; and a CRD channel interface 930.

The CRD adapter 900 generally serves as an interface between the tower assembly 500 and the CRD 125. The CRD seating flange 910 may be positioned at a first end of the CRD adapter 900 and may engage an end of the CRD drive 125. To connect the first end of the CRD adapter 900 to the CRD drive 125, an operator may rotate the CRD adapter cup 920 to fit the CRD seating flange 910 to the CRD drive 125.

The CRD channel interface 930 may be positioned on an opposite second end of the CRD adapter 900. The interface 930 may mate with the extension channel 575.

Figure 17:
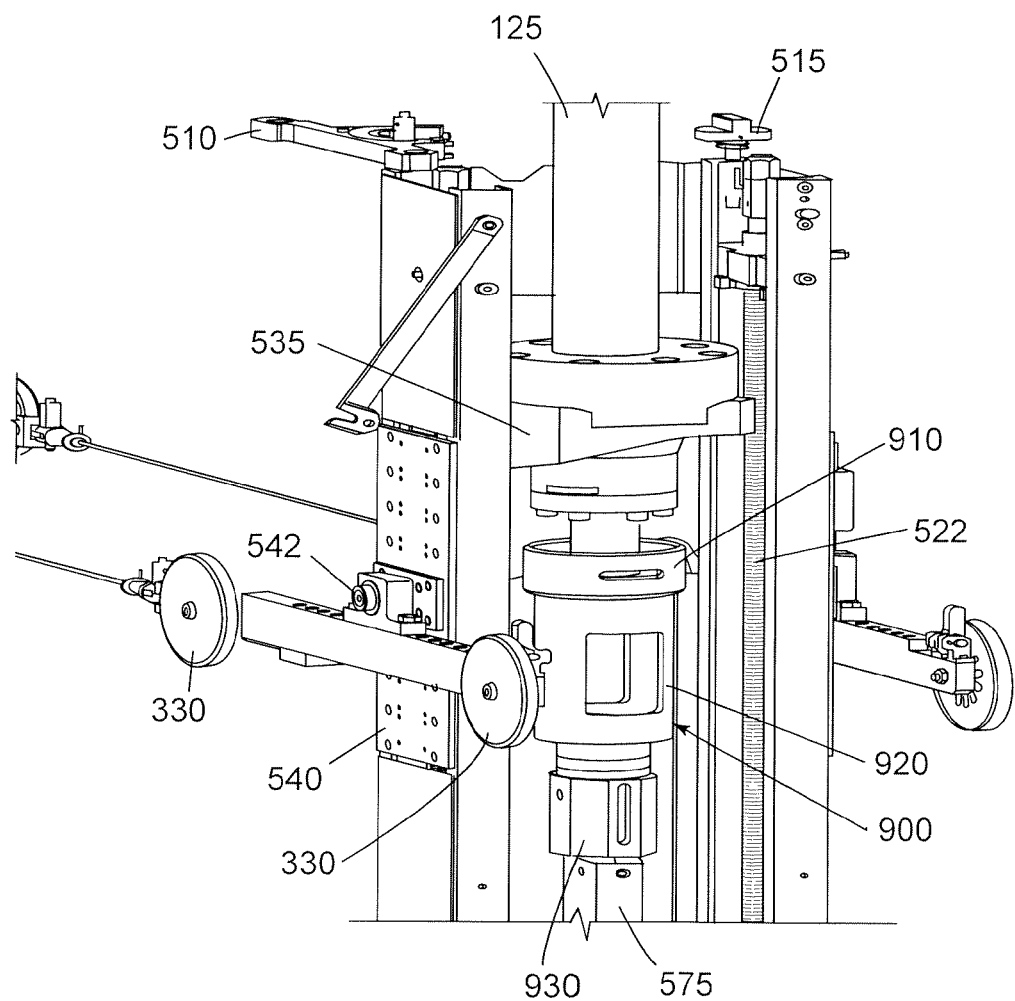
FIG. 17 is a perspective view of the CRD adapter of FIG. 16 integrated with the tower assembly of FIG. 3, in accordance with an embodiment of the present invention.

Referring now to FIG. 17, which is a perspective view of the CRD adapter 900 of FIG. 16 integrated with the tower assembly 500 of FIG. 3, in accordance with an embodiment of the present invention. As discussed, the CRD seating flange 910 may be connected to a portion of the CRD 125

FIG. 17 also illustrates the connection between the CRD channel interface 930 and the extension channel 575. The interface 930 may include an opening (not illustrated), which receives an end of the extension channel 575. The connection may be of a type that allows for mating between the interface 930 and the channel 930.

Lead Cart Assembly

Figure 18:
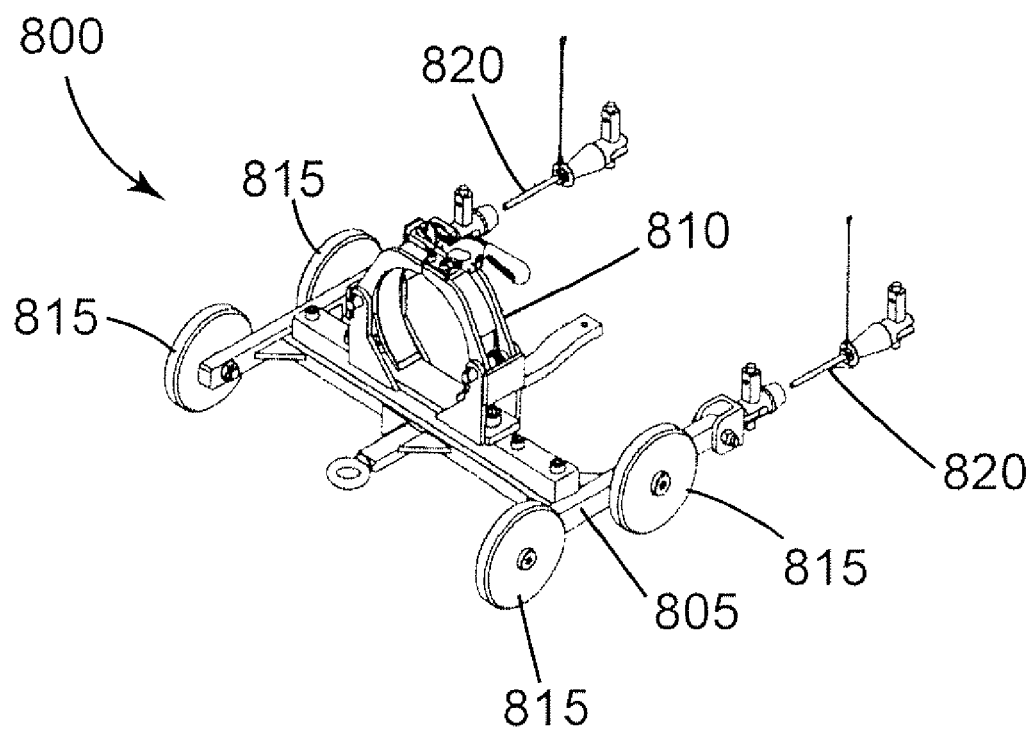
FIG. 18 is a partially exploded perspective view of the lead cart assembly of FIG. 3 in accordance with an embodiment of the present invention.

The lead cart assembly 800 may assist the tower assembly 500 in moving the CRD 125 from the under vessel area 130 to through the transfer chute 175. Referring now to FIG. 18, which is a partially exploded perspective view of the lead cart assembly 800 of FIG. 3 in accordance with an embodiment of the present invention. The lead cart assembly 800 may be formed of a stainless steel and may include a lead cart frame 805; a lead cart clamp 810; a plurality of lead cart wheels 815; and a plurality of lead cart cables 820.

The plurality of lead cart wheels 815 and the lead cart clamp 810 may be connected to the rectangular shaped lead cart frame 805. The lead cart clamp 810 may receive and secure a portion of the CRD 125.

A portion of each of the plurality of lead cart cables 820 may be connectable to the lead cart frame 805. An embodiment of the present invention may allow for the lead cart cables 820 to be separated and reconnected to the lead cart frame 805. This may allow for an operator to separate the lead cart assembly 800 from the trunnion cart assembly 300 when not in use.

Integrated Drive Exchange Assembly System Operation

As discussed, the integrated drive exchange assembly system 1000 may include a first 520 and a second screw 522; each screw 520, 522 may operate independently of the other screw 520, 522. An operator may connect an air-operated wrench, or the like, to the hex head 526 of each screw 520, 522. If the operator uses the wrench to rotate the first screw 520, then the elevator platform 535 may move up or down in a vertical direction. If the operator uses the wrench to rotate the second screw 522, then the extension channel 575 may move up or down in a vertical direction.

Figure 19A:
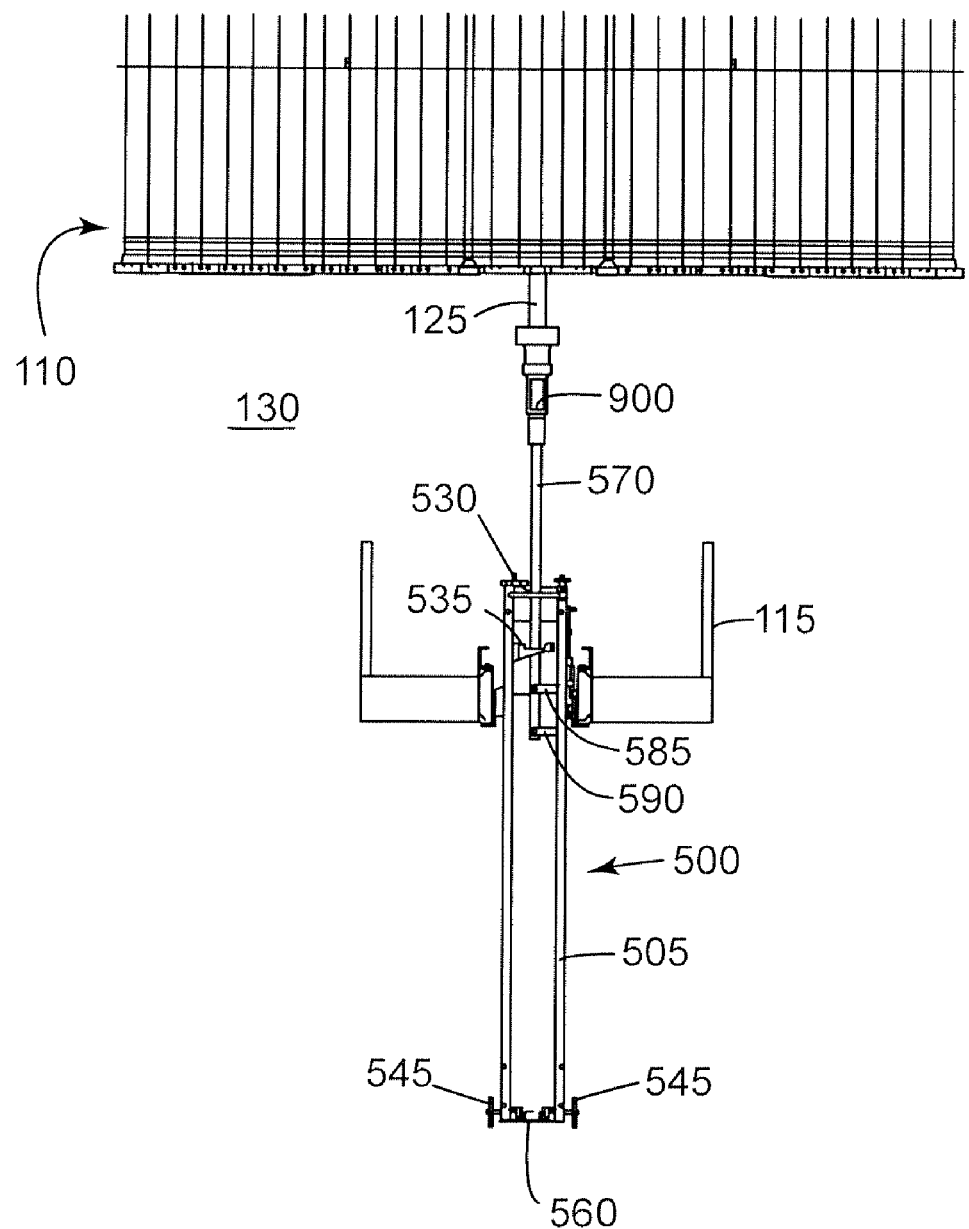
FIGS. 19a-19c, collectively FIG. 19, which is an elevation view of the integrated drive exchange assembly system in use, in accordance with an embodiment of the present invention.
Figure 19B:
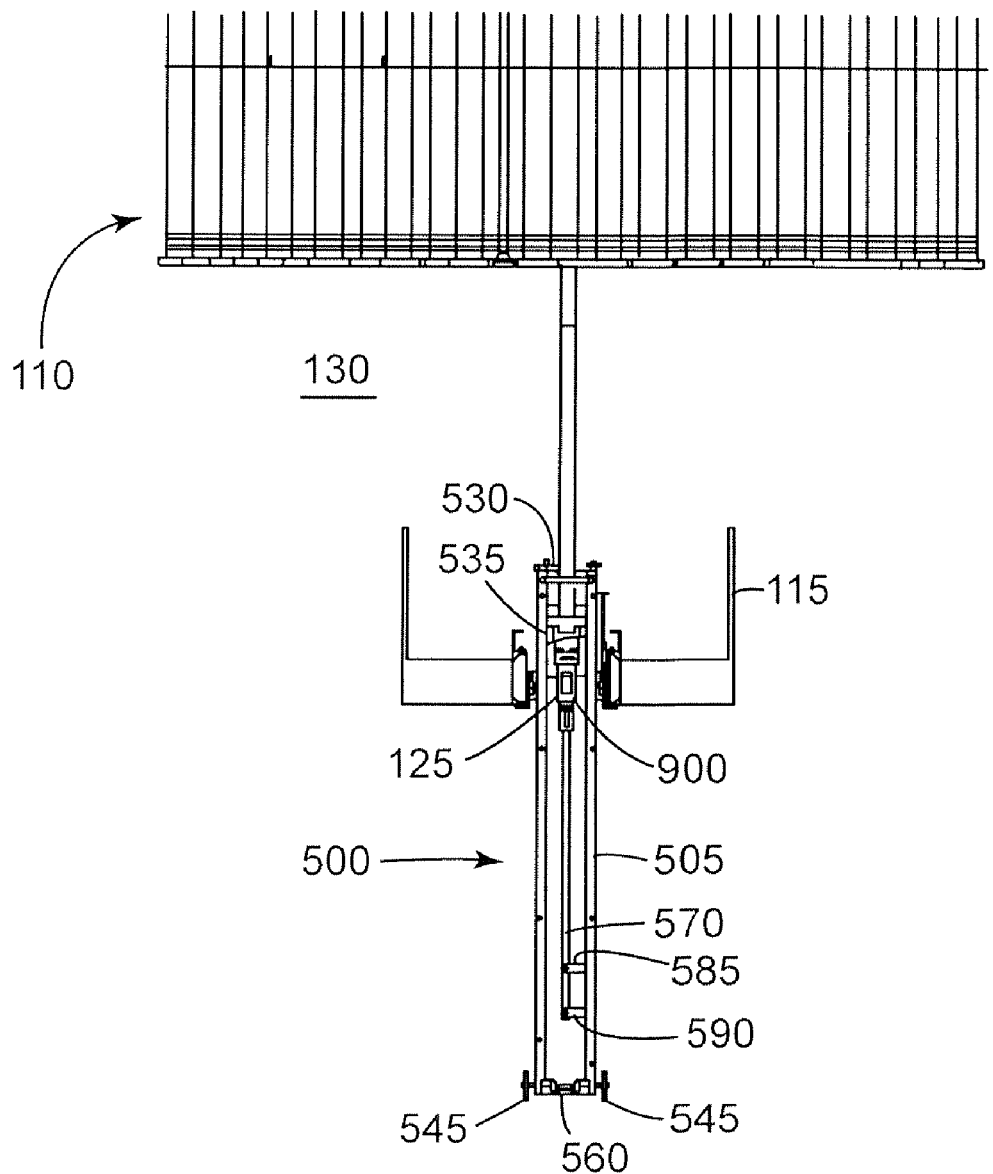
Figure 19C:
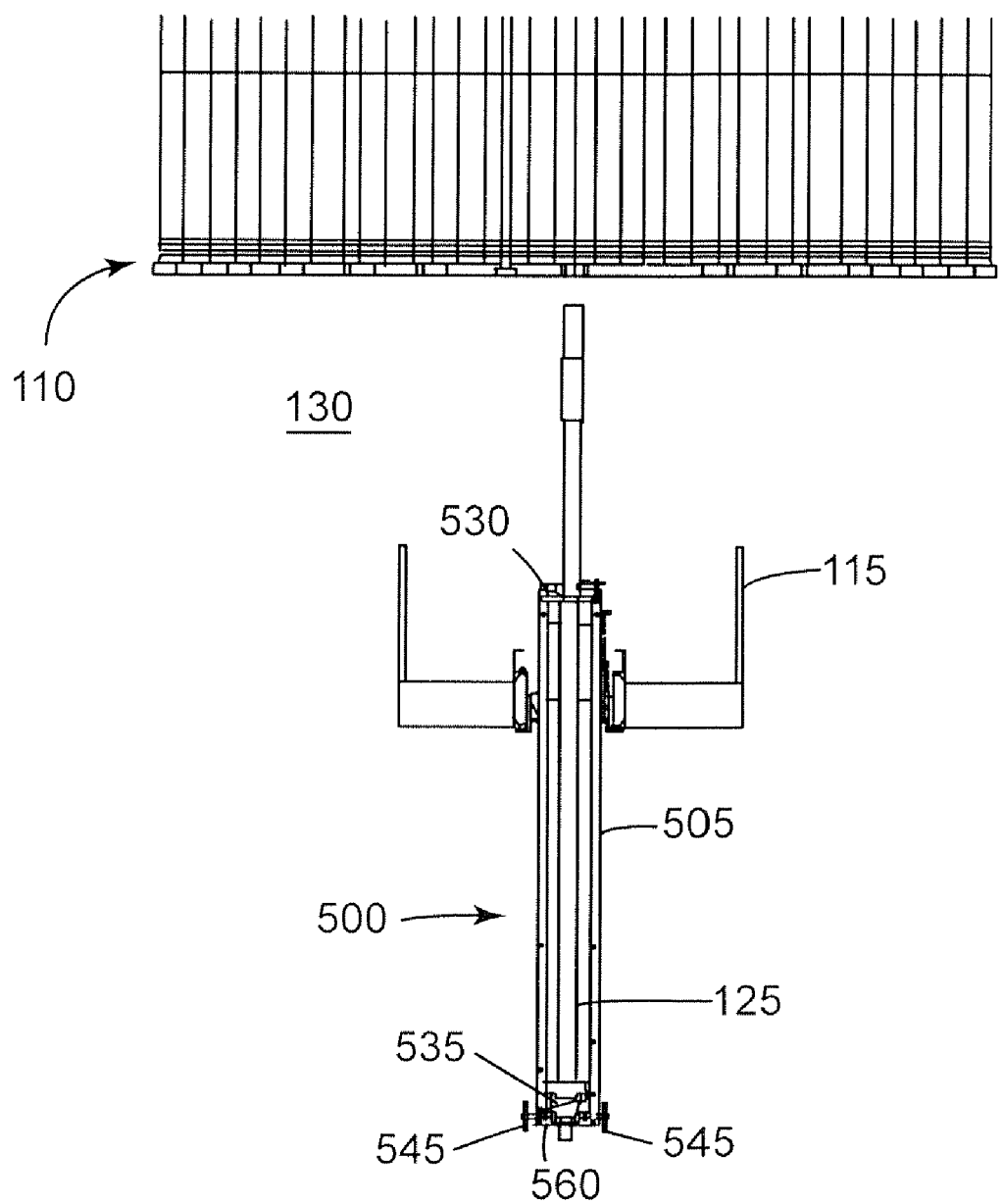

FIGS. 19a-19c, collectively FIG. 19, illustrate an elevation view of the IDEAS 1000 in use, in accordance with an embodiment of the present invention.

In FIG. 19a the IDEAS 1000 is in operation to remove a CRD 125 from the reactor pressure vessel 110. As illustrated in FIG. 19a, the CRD adapter 900 is connected to the extension channel 575. The second screw 522 has been rotated to extend the extension channel 575 into the under vessel area 130. The CRD adapter 900 is also connected to the CRD 125. Also, the positions of the upper extension roller link 585 and lower extension roller link 590 are near the equipment platform 135.

In FIG. 19b, the CRD 125 is lowered into the tower 505. Here, the second screw 522 has been rotated in a direction that lowered the extension channel 575 into the tower 505. FIG. 19b also illustrates that the position of the CRD adapter 900 is within the tower. Also, the positions of the upper extension roller link 585 and lower extension roller link 590 are near the end plate assembly 560.

In FIG. 19c, the CRD 125 is fully lowered into the tower 505. The second screw 522 is rotated until the CRD 125 engages the elevator platform 535 within the tower 505. Then an operator may remove the CRD adapter 900 from the tower assembly 500. The extension channel 575 may then be stored within the tower 505, as discussed. Next, the first screw 520 may be rotated to lower the elevator platform 535 until the CRD 125 is lowered further in the tower 505. Here, the position of the elevator platform 535 is near the end plate assembly 560 and tower assembly 500 may be rotated into a horizontal position.

Figure 20:
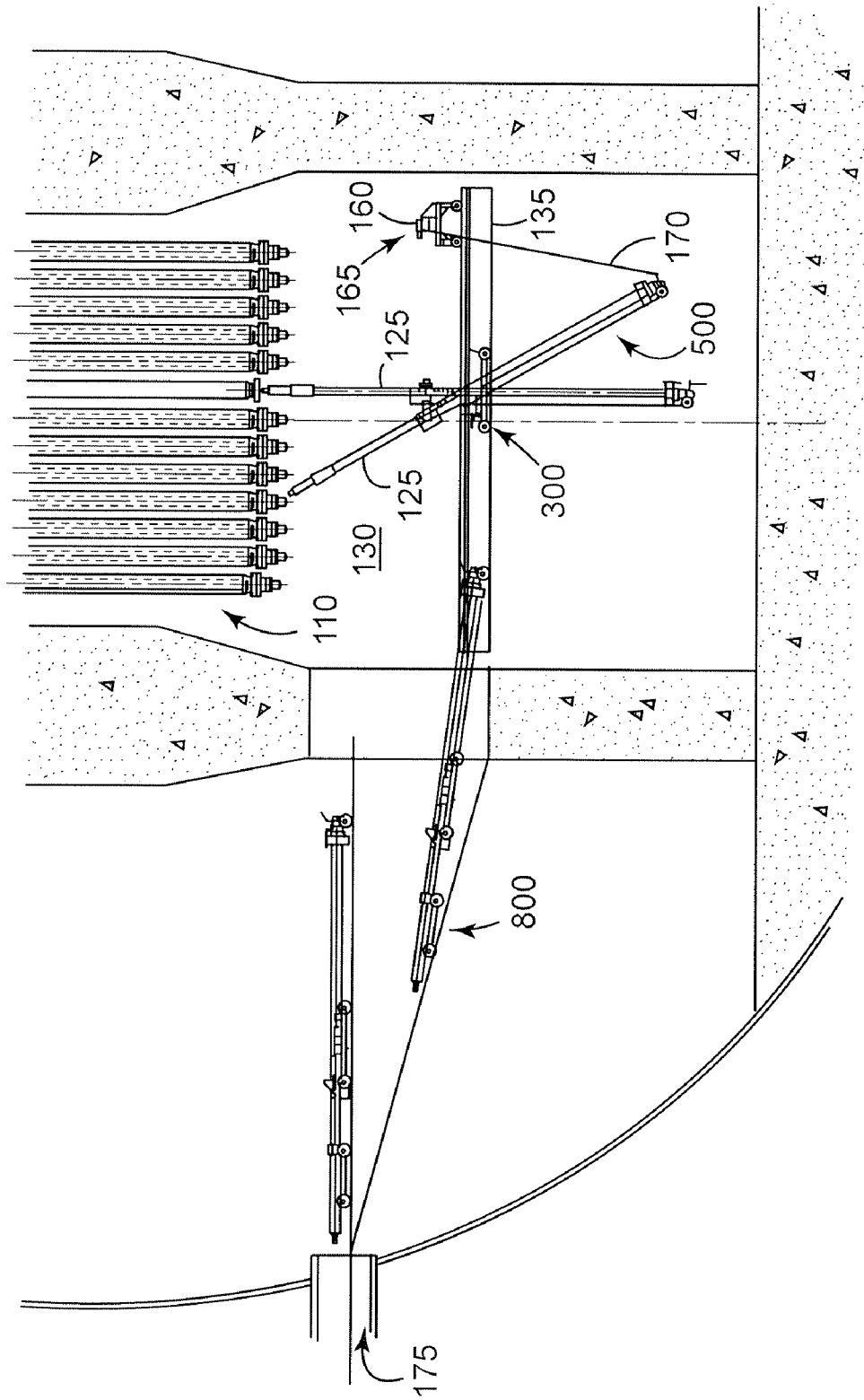
FIG. 20 is a schematic illustrating the environment in which a CRD is loaded into the integrated drive exchange assembly system in accordance with an embodiment of the present invention.

FIG. 20 is a schematic illustrating the environment in which a CRD 125 is loaded into the integrated drive exchange assembly system 100 in accordance with an embodiment of the present invention. FIG. 20 illustrates the integrated drive exchange assembly system 1000 in operation to remove of the CRD 125 from the reactor pressure vessel 110. After the CRD 125 is lowered into the tower assembly 500, as described in FIG. 19, the vertical lock assembly 550 (illustrated in FIG. 15) may release the tower assembly 500 to allow for the rotation from the vertical position to a horizontal position. An operator may use the winch assembly 165 of the upender cart 160 to assist with the rotation. Next, the lead cart 800 may be connected to the trunnion cart assembly 300 and then used to assist in moving the IDEAS 1000 through the transfer chute 175.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been shown and described in considerable detail with respect to only a few exemplary embodiments thereof, it should be appreciated that any arrangement that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. An integrated drive exchange assembly system for moving a control rod drive in a nuclear reactor, the reactor including a reactor pressure vessel, an under vessel area located below the reactor pressure vessel, and an equipment platform between the under vessel area and a basement, the system comprising: a tower forming a control rod drive receiving area comprising an open face and an open trough; a first and a second screw extending substantially the length of the tower, the first and the second screw mounted to opposite sides of the tower, wherein the first and the second screw sequentially operate when moving a control rod drive; an elevator platform movable relative to the first and the second screws, the platform configured to engage a portion of the control rod drive and to substantially support the control rod drive; wherein a rotation of the first screw causes the vertical movement of the elevator platform, and wherein a rotation of the second screw does not cause the vertical movement of the elevator platform; and wherein as the first screw rotates the elevator platform vertically moves between a top limit and a bottom limit; an extension carriage assembly movable relative to the first and the second screws, the extension carriage assembly configured to engage a portion of a control rod drive (CRD) adapter and to substantially support the control rod drive; wherein a rotation of the second screw causes the vertical movement of the extension carriage assembly, and wherein a rotation of the first screw does not cause the vertical movement of the extension carriage assembly and wherein as the second screw rotates the extension carriage vertically moves; and a trunnion cart engaged to the tower such that the tower is rotatable relative thereto; the trunnion cart comprising an automatic vertical lock for locking the tower in a vertical position; wherein the integrated drive exchange assembly system is operable for moving the CRD from the reactor pressure vessel and movable with the control rod drive such that the integrated drive exchange assembly system and the control rod drive are movable together out from the under vessel area.

2. The system of claim 1 wherein the tower is constructed from stainless steel.

3. The system of claim 1 wherein the length of the tower is approximately the length of the control rod drive.

4. The system of claim 1 wherein the extension carriage assembly comprises an extension channel; and wherein a plurality of links is secured to the tower, the links configured to support the extension channel, the link rotatable relative to the tower such that the extension channel can be moved between a first position and a second position; and wherein the extension channel moves to the second position after the elevator platform reaches the top limit.

5. The system of claim 1 wherein at least one end of each of the first and the second screws has a head at an end distal to the elevator platform, wherein the head allows for the screw to be rotated.

6. The system of claim 1 wherein the elevator platform allows for a portion of the control rod drive to extend through the elevator platform.

7. The system of claim 1 further comprising at least one lower bearing block secured at one end of the first and the second screws to the tower, and the first and the second screws extending through the lower bearing block.

8. The system of claim 1 wherein the trunnion cart comprises at least one pillow block and at least one vertical lock pillow block and said tower has a trunnion axle secured to a mounting plate thereof, the trunnion axle engagable to the at least one pillow block and the at least one vertical lock pillow block and rotatable therein.

9. The system of claim 8 wherein the at least one vertical lock pillow block can engage the automatic vertical lock for maintaining the tower in an approximately vertical position.

10. The system of claim 1 wherein the tower further comprises a plurality of wheels at one end thereof, the wheels movable from a transport position to an inoperative position.

11. The system of claim 1 wherein the CRD adapter is mountable on the extension carriage assembly and has one end configured to engage the control rod drive.

12. The system of claim 1 further comprising a lead cart assembly, the lead cart assembly comprising a lead cart clamp for contacting a portion of the control rod drive and at a plurality of lead cart cables for extending from the assembly to the trunnion cart assembly.

13. The system of claim 1 further comprising an upender cart comprising a winch assembly the winch assembly operable to move the tower between vertical and horizontal positions.

14. An integrated drive exchange assembly system for moving a control rod drive in a nuclear reactor, the reactor including a reactor pressure vessel, an under vessel area located below the reactor pressure vessel, and an equipment platform between the under vessel area and a basement, the system comprising: a tower forming a control rod drive receiving area comprising an open face and an open trough; and further comprising at least one lower bearing block secured at one end of the first and the second screws to the tower, and the first and the second screws extending through the lower bearing block; a first and a second screw extending substantially the length of the tower, the first and the second screw mounted to opposite sides of the tower, wherein the first and the second screw sequentially operate when moving a control rod drive; an elevator platform movable relative to the first and the second screws, the platform configured to engage a portion of the control rod drive and to substantially support the control rod drive; wherein a rotation of the first screw causes the vertical movement of the elevator platform, and wherein a rotation of the second screw does not cause the vertical movement of the elevator platform; wherein the elevator platform allows for a portion of the control rod drive to extend through the elevator platform; and wherein as the first screw rotates the elevator platform vertically moves between a top limit and a bottom limit; an extension carriage assembly movable relative to the first and the second screws, the extension carriage assembly configured to engage a portion of a control rod drive adapter and to substantially support the control rod drive; wherein a rotation of the second screw causes the vertical movement of the extension carriage assembly, and wherein a rotation of the first screw does not cause the vertical movement of the extension carriage assembly and wherein as the second screw rotates the extension carriage vertically moves; wherein the extension carriage assembly comprises an extension channel and wherein at least one link is secured to the tower, the link configured to support the extension channel, the link rotatable relative to the tower such that the extension channel can be moved between a first position and a second position; and wherein the extension channel moves to the second position after the elevator platform reaches the top limit; further comprising at least one link secured to the tower, the link configured to support the extension channel, the link rotatable relative to the tower such that the extension channel can be moved between a first position and a second position; and a trunnion cart engaged to the tower such that the tower is rotatable relative thereto; the trunnion cart comprising an automatic vertical lock for locking the tower in a vertical position; wherein the integrated drive exchange assembly system is operable for moving the CRD from the reactor pressure vessel and movable with the control rod drive such that the integrated drive exchange assembly system and the control rod drive are movable together out from the under vessel area.

15. The system of claim 14 wherein the trunnion cart comprises at least one pillow block and at least one vertical lock pillow block and said tower has a trunnion axle secured to a mounting plate thereof, the trunnion axle engagable to the at least one pillow block and the at least one vertical lock pillow block and rotatable therein; and wherein the at least one vertical lock pillow block can engage the automatic vertical lock for maintaining the tower in an approximately vertical position.

16. The system of claim 14 wherein the tower further comprises a plurality of wheels at one end thereof, the wheels movable from a transport position to an inoperative position.

17. The system of claim 14 wherein the control rod drive adapter is mountable on the extension carriage assembly and has one end configured to engage the control rod drive.

18. The system of claim 14 further comprising a lead cart assembly, the lead cart assembly comprising a lead cart clamp for contacting a portion of the control rod drive and a plurality of lead cart cables for extending from the assembly to the trunnion cart assembly.

19. The system of claim 14 further comprising an upender cart comprising a winch assembly the winch assembly operable to move the tower between vertical and horizontal positions.

20. The system of claim 14 wherein the tower is constructed from stainless steel and wherein the length of the tower is approximately the length of the control rod drive.

* * * * *